United States Patent
Kim et al.

(10) Patent No.: US 9,812,995 B2
(45) Date of Patent: Nov. 7, 2017

(54) PIEZOELECTRIC POWER GENERATOR USING WIND POWER

(71) Applicant: Soongsil University Research Consortium Techno-Park, Seoul (KR)

(72) Inventors: Jin Oh Kim, Seoul (KR); Dae Jong Kim, Siheung-si (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 518 days.

(21) Appl. No.: 14/529,607

(22) Filed: Oct. 31, 2014

(65) Prior Publication Data
US 2015/0115775 A1  Apr. 30, 2015

(30) Foreign Application Priority Data
Oct. 31, 2013  (KR) .................. 10-2013-0131074

(51) Int. Cl.
H01L 41/113 (2006.01)
H02N 2/18 (2006.01)
F03D 5/06 (2006.01)

(52) U.S. Cl.
CPC .............. *H02N 2/185* (2013.01); *F03D 5/06* (2013.01); *F05B 2220/709* (2013.01); *Y02E 10/70* (2013.01)

(58) Field of Classification Search
CPC  F23Q 3/002; H02N 2/185; F03D 5/06; H01L 4/113
USPC .......................................... 310/339
See application file for complete search history.

(56) References Cited

U.S. PATENT DOCUMENTS

| | | | | |
|---|---|---|---|---|
| 3,550,583 A | * | 12/1970 | Takewo | A61B 5/0215 600/488 |
| 4,387,318 A | * | 6/1983 | Kolm | F03B 13/141 310/330 |
| 4,536,674 A | * | 8/1985 | Schmidt | F03D 5/00 310/330 |
| 7,528,528 B2 | * | 5/2009 | Zanella | G08G 1/095 310/339 |
| 7,560,856 B2 | * | 7/2009 | Chen | E21B 41/0085 310/339 |

(Continued)

FOREIGN PATENT DOCUMENTS

| KR | 10-2010-0036525 A | 4/2010 |
|---|---|---|
| KR | 10-2012-0066908 A | 6/2012 |
| KR | 10-20120066911 A | 6/2012 |

OTHER PUBLICATIONS

Pobering, et al., "Piezoelectric Power Conversion with Self-Induced Oscillation", PowerMEMS 2009, Dec. 1, 2009, pp. 384-387.

*Primary Examiner* — Thomas Dougherty
(74) *Attorney, Agent, or Firm* — Pearne & Gordon LLP

(57) ABSTRACT

A piezoelectric power generator using wind power is provided. To elaborate, the piezoelectric power generator has a central axis unit with a charger, a piezoelectric film supporting frame engaged onto an outer circumference surface of the central axis unit, and a piezoelectric film having a pre-set area and at least one side engaged to at least one of one side part of the piezoelectric supporting frame and the central axis unit. In addition, the piezoelectric film supporting frame has a shape corresponding to a shape of an edge of the piezoelectric film to surround the edge of the piezoelectric film.

7 Claims, 6 Drawing Sheets

(56) References Cited

U.S. PATENT DOCUMENTS

| | | | | |
|---|---|---|---|---|
| 8,067,878 B1* | 11/2011 | Lu | ................. | H02N 2/181 |
| | | | | 310/339 |
| 8,610,304 B2* | 12/2013 | Filardo | ............. | F03B 17/06 |
| | | | | 290/43 |
| 8,884,496 B2* | 11/2014 | Lipson | ............. | H02N 2/185 |
| | | | | 310/330 |
| 2009/0121489 A1* | 5/2009 | Kawai | ............. | F03D 5/06 |
| | | | | 290/55 |
| 2010/0164231 A1* | 7/2010 | Tsou | ................. | F03D 5/00 |
| | | | | 290/55 |
| 2013/0264829 A1* | 10/2013 | Jordan, Sr. | ........ | F03D 9/007 |
| | | | | 290/55 |
| 2014/0312742 A1* | 10/2014 | Balasingam | ...... | H02N 2/185 |
| | | | | 310/339 |

* cited by examiner

PIEZOELECTRIC POWER GENERATOR USING WIND POWER

CROSS-REFERENCE TO RELATED APPLICATION

This application claims the benefit of Korean Patent Application No. 10-2013-0131074 filed on Oct. 31, 2013, the disclosure of which is incorporated herein by reference.

BACKGROUND

The embodiments described herein pertain generally to a piezoelectric power generator generating electricity by using wind power.

Conventionally, a wind power generation method, which rotates huge facilities such as propellers through wind power to induce electrons, has been widely used. However, the conventional wind power generation device has been inefficient because conditions for providing the device (e.g., locations) are restricted, there is difficulty in management and maintenance, and high costs are required. In order to resolve the problems, a generation device using a piezoelectric device, which can be miniaturized and which adopts a relatively simple generation method, has been suggested.

In this regard, Korean Patent Application Publication No. 10-2012-0066911 (Title of Invention: Wind power generation device using PVDF (polyvinylidene fluoride) film piezoelectric element) describes a wind power generation device using a PVDF film piezoelectric device, in which the wind power generation device is embodied as a polyvinylidene fluoride (PVDF) film type of a wind power generation device converting kinetic energy by a piezoelectric direct effect into electric energy.

In addition, Korean Patent Application Publication No. 2010-0036525 (Title of Invention: Piezoelectric Generator Using Wind Power) describes a piezoelectric power generator, which applies mechanical stimulation to a piezoelectric to retrieve electric power generated from the piezoelectric, and comprises a support axis, a shaft bearing-engaged in a top portion of the support axis, rotating blades protruded from an outer periphery of the shaft to rotate the shaft through wind power, a frame provided on the top portion of the support axis, multiple cantilevers radially arranged in the frame, a piezoelectric mounted on one surface of each of the cantilevers, and hitting means formed on the outer peripheral of the shaft to hit top portions of the cantilevers.

However, the conventional power generation device using a piezoelectric device has a limit in that the direction of usable wind is restricted and it conducts the wind power generation by using warn currents while requiring separate equipment such as an inclined entrance. Further, the method of acquiring electric energy in that the impact of wind rotates a rotational body is disadvantageous in that wind energy is used for rotating the rotational body, thereby resulting in high energy loss.

SUMMARY

In view of the foregoing, example embodiments provide a piezoelectric power generator using vortex-type wind power. However, the problems sought to be solved by the present disclosure are not limited to the above description and other problems can be clearly understood by those skilled in the art from the following description.

In accordance with one example embodiment, there is provided a piezoelectric power generator using wind power, comprising: a central axis unit comprising a charger; a piezoelectric film supporting frame engaged onto an outer circumference surface of the central axis unit and comprising at least one frame; and a piezoelectric film having a pre-set area and at least one side being engaged to at least one of one side part of the piezoelectric supporting frame and the central axis unit, wherein electricity generated by the piezoelectric film is delivered to a charger of the central axis unit, and the piezoelectric film supporting frame has a shape corresponding to a shape of an edge of the piezoelectric film to surround the edge of the piezoelectric film, and the piezoelectric power generator comprises at least one pair consisting of the piezoelectric film and the piezoelectric film supporting frame.

In accordance with the example embodiments, the piezoelectric power generator is in an open type and vortex occurs by the frame surrounding the edge of the piezoelectric film so that the piezoelectric film is vibrated, irrespective of wind directions, to generate electric energy.

In accordance with the example embodiments, since electricity is produced by vibrating the piezoelectric by means of vortex-type wind power, electric energy can be generated only from light wind, compared to conventional wind power generation. Nevertheless, combination with other wind power energy generation fields is easy.

In accordance with the example embodiments, since the arrangement and the number of pairs of the piezoelectric film and the piezoelectric film supporting frame can be freely changed, the piezoelectric power generator can be easily modified to be suitable for an installation environment.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

Non-limiting and non-exhaustive embodiments of the present disclosure will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION

Figure 1:
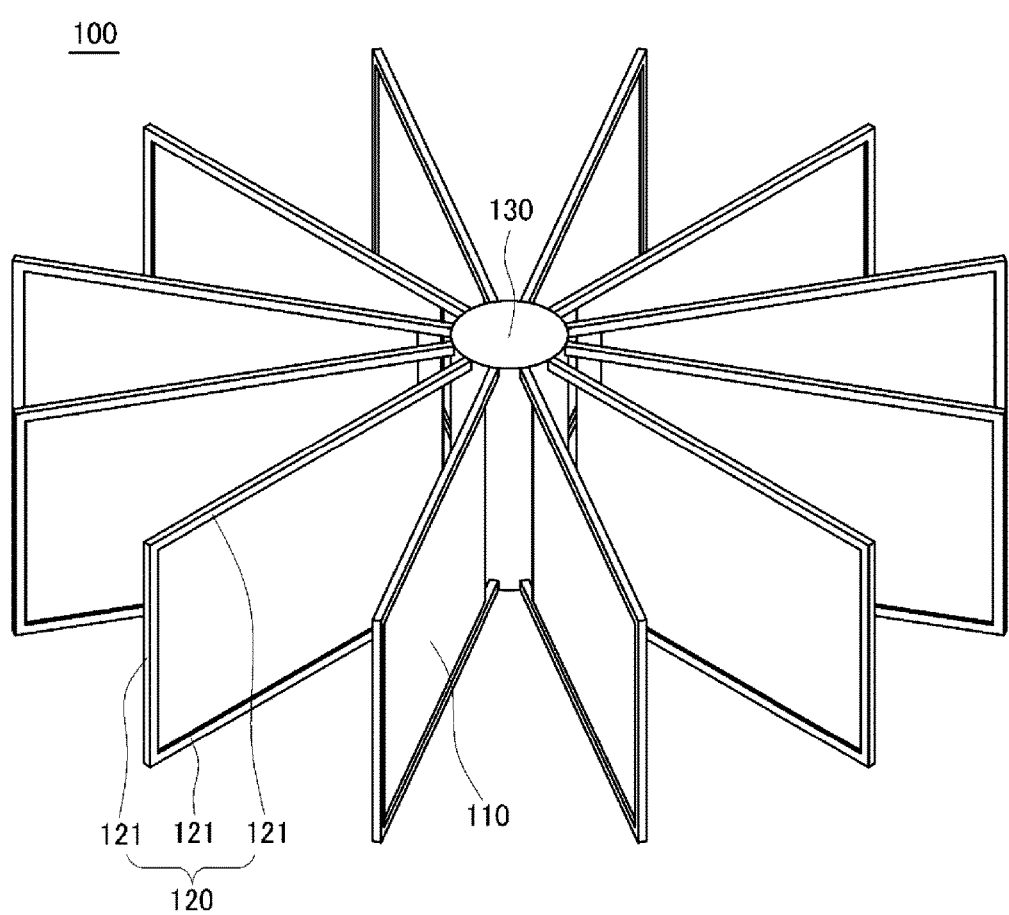
FIG. 1 is a configuration view of a piezoelectric power generator in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Through the whole document, the term "on" that is used to designate a position of one element with respect to another element includes both a case that the one element is adjacent to the another element and a case that any other element exists between these two elements. Further, the term "comprises or includes" and/or "comprising or including" used in the document means that one or more other components, steps, operations, and/or the existence or addition of elements are not excluded in addition to the described components, steps, operations and/or elements.

Figure 2:
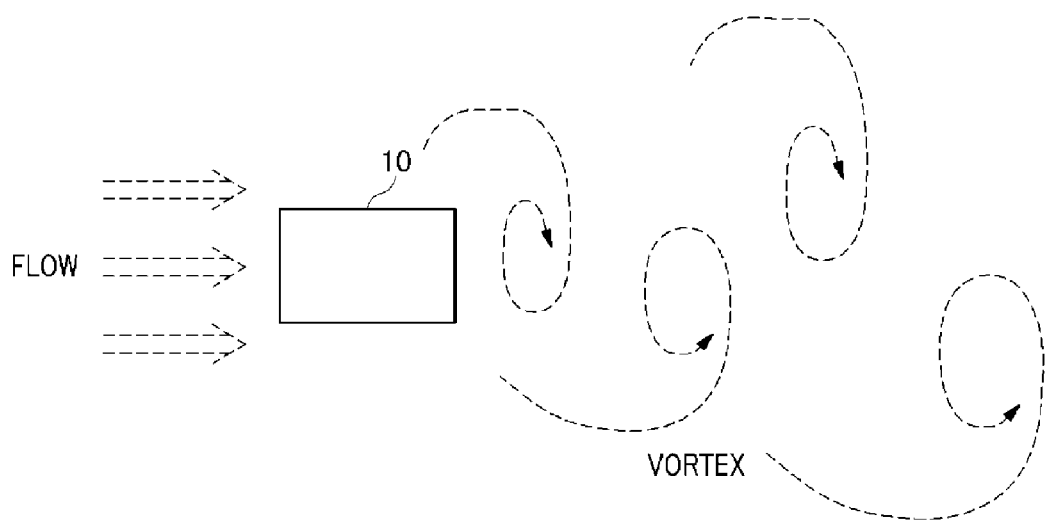
FIG. 2 shows vortex-type wind power applied to an example embodiment.

FIG. 1 is a configuration view of a piezoelectric power generator in accordance with an example embodiment. FIG. 2 shows vortex-type wind power applied to an example embodiment. As illustrated in FIG. 1, a piezoelectric power generator 100 includes a piezoelectric film 110, a piezoelectric film supporting frame 120 surrounding an edge of the piezoelectric film 110, and a central axis unit 130, onto which the piezoelectric film supporting frame 120 is engaged.

FIG. 1 further illustrates that the central axis unit 130 is a structure having a short cylindrical shape, and the piezoelectric film 110 has a rectangular plate shape. Also, FIG. 1 illustrates that each frame 121 forming the piezoelectric film supporting frame 120 has a cylindrical rod shape, and the multiple frames 121 are of a rectangular shape corresponding to the shape of the edge of the piezoelectric film 110, while having a larger area than that of the piezoelectric film 110.

For reference, the piezoelectric film 110 and the piezoelectric film supporting frame 120 in accordance with an example embodiment may be formed in various shapes such as circles and polygons, in addition to the rectangular shape shown in FIG. 1. Also, the central axis unit 130 may be formed in various polyhedral shapes, in addition to the cylindrical shape. Also, the multiple frames 121 of the piezoelectric film supporting frame 120 may be formed in a shape of one integrated cylindrical rod, which is bent to correspond to the shape of the piezoelectric film 110, or in the manner that ends of multiple cylindrical rods are connected to one another.

Specifically, the piezoelectric film 110 is a film-type piezoelectric, and when the piezoelectric is vibrated, it results in deformation to generate electric energy. For reference, the electricity generated from the piezoelectric film 110 is delivered to and stored in a charger (not illustrated) configured in the central axis unit 130.

The piezoelectric film supporting frame 120 consists of the multiple frames 121, which include upper and lower frames, and a side frame connected between the upper and lower frames. In this case, each of the multiple frames 121 has a specific cross-section area, and the cross-section area of each of the frames 121 may be set to an area sufficient enough to convert wind into vortex.

Specifically, the vortex-type wind power applied to an example embodiment is generated by the principle illustrated in FIG. 2. As shown in FIG. 2, when air flow ("Flow") occurs toward a certain structure 10 from the outside thereof (e.g., the "front"), a portion where the air flow is rotated like swirling storms (i.e., vortex) is generated in the rear of the structure 10. In this case, swirling storms being rotated in opposite directions alternatively and regularly occur in both sides of the portion.

According to this principle, when receiving wind (air currents or others) blowing from one direction, the piezoelectric power generator 100 in accordance with an example embodiment changes the wind into vortex through at least one of the piezoelectric film supporting frame 120 (i.e., a frame facing the direction, toward which the wind blows) and the central axis unit 130. In this case, when the piezoelectric film 110 is exposed to the vortex, a pressure difference occurs between both surfaces of the piezoelectric film 110 so that the piezoelectric film 110 is vibrated.

The piezoelectric film supporting frame 120 supporting the edge of the piezoelectric film 110 is engaged onto the central axis unit 130, and the central axis unit 130 receives the electricity generated from the piezoelectric film 110 to store the electricity in a charger (not illustrated). In this case, the charger (not illustrated) of the central axis unit 130 may be configured as one charger to be connected to all of the multiple piezoelectric films 110, or a plurality of chargers may be connected to the piezoelectric films 110, respectively. In this case, the multiple chargers (not illustrated) may be connected in parallel by electrodes (i.e., "+" and "−" poles).

FIG. 1 does not separately illustrate the charger, assuming that the charger is included in an internal space of the central axis unit 130, but the charger in accordance with an example embodiment may be included in various manners in the central axis unit 130, e.g., the charger being mounted on one outer surface of the central axis unit 130 or provided in the inside of the central axis unit 130. In addition, the central axis unit 130 itself may be configured as the charger.

Additionally, in the piezoelectric power generator 100 in accordance with an example embodiment, at least one edge of the piezoelectric film 110 is fixed to at least one of the piezoelectric film supporting frame 120 and the central axis unit 130. That is, the piezoelectric film 110 is engaged onto any one of the upper, lower and side frames of the piezoelectric film supporting frame 120 and the central axis unit 130.

In this case, each of the multiple piezoelectric films 110 may be engaged to an identical frame 121 of the multiple piezoelectric film supporting frames 120 or the central axis unit 130. In addition, the multiple piezoelectric films 110 may be engaged to respective different frames 121 of the multiple piezoelectric film supporting frames 120 or the central axis unit 130.

Hereinafter, the structure where the electricity generated from the piezoelectric film 110 is delivered to and stored in a charger of the central axis unit 130 in accordance with an example embodiment is described in detail with reference to FIG. 3.

Figure 3:
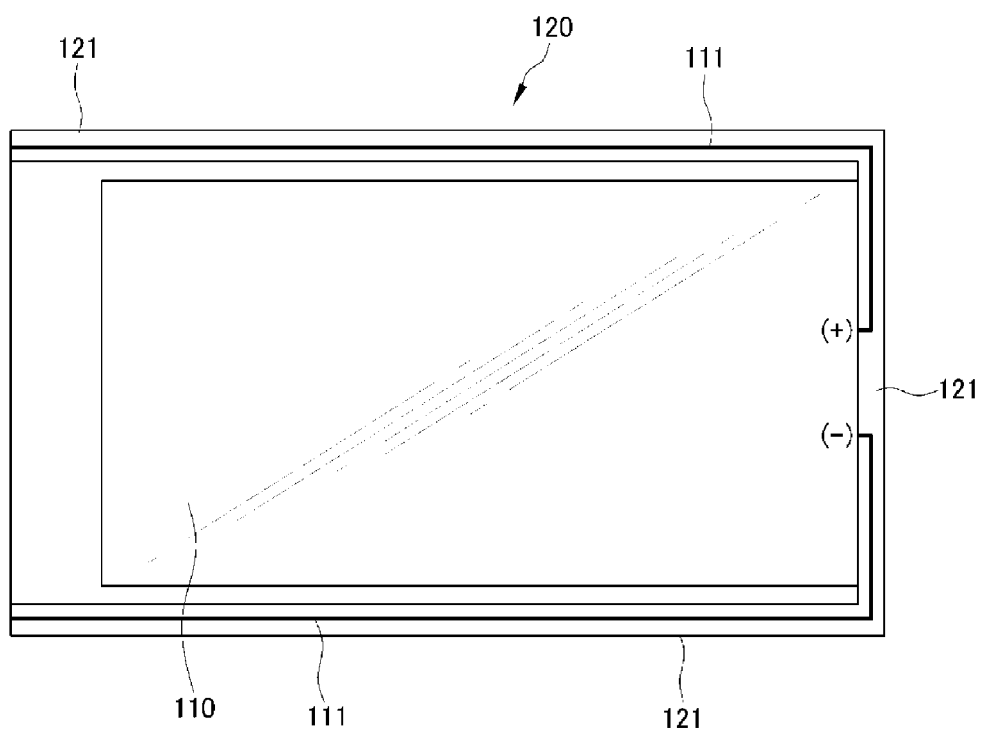
FIG. 3 shows an engagement structure of a piezoelectric film and a piezoelectric film supporting frame in accordance with an example embodiment.

FIG. 3 shows an engagement structure of the piezoelectric film and the piezoelectric film supporting frame in accordance with an example embodiment. FIG. 3 illustrates that an electric wire 111 for delivering electricity is connected between the piezoelectric film 110 and the charger (not illustrated) of the central axis unit 130. In this case, as illustrated in FIG. 3, space is formed in the inside of the frame 121 of the piezoelectric film supporting frame 120, and the electric wire 111 connected to the piezoelectric film 110 passes through the internal space of the frame 121 of the piezoelectric film supporting frame 120 to be connected to the charger of the central axis unit 130.

FIG. 1 and FIG. 3 illustrate the form that one edge of the piezoelectric film 110 is fixed to one frame 121 of the piezoelectric film supporting frame 120. However, one edge of the piezoelectric film 110 may be fixed to the central axis unit 130 itself, and the piezoelectric film supporting frame 120 may be fixed to a position corresponding to the position where the piezoelectric film 110 is fixed, such that the piezoelectric film supporting frame surrounds the other edge of the piezoelectric film 110. Connecting the piezoelectric film 110 directly to the central axis unit 130 as described above is efficient since a separate electric wire does not need to be provided, or a length of the electric wire can be shortened.

In addition, FIG. 3 illustrates that only the shortest one (indicating the "right edge" in FIG. 3) of the multiple edges of the piezoelectric film 110 is fixed and engaged to one frame 121 (indicating the side frame 121 corresponding to the right edge of the piezoelectric film in FIG. 3) of the piezoelectric film supporting frames 120. By fixing only the shortest one of the multiple edges of the piezoelectric film 110 to the piezoelectric film supporting frame 120 or the central axis unit 130, the vibration of the piezoelectric film 110 can be maximized.

FIG. 1 illustrates that in the piezoelectric power generator 100 in accordance with an example embodiment, the multiple piezoelectric film supporting frames 120 are arranged and fixed along the circumference of the central axis unit 130 (i.e., in a radial form). Accordingly, the piezoelectric generator 100 in accordance with an example embodiment can generate vortex-type wind power, irrespective of wind directions, and produce electricity by using the wind power.

In addition to radially fixing pairs of the piezoelectric film 110 and the piezoelectric film supporting frame 120 based on the central axis unit 130 as shown in FIG. 1, the pairs of the piezoelectric film 110 and the piezoelectric film supporting frame 120 may be engaged to the central axis unit 130 in other various manners.

Figure 4:
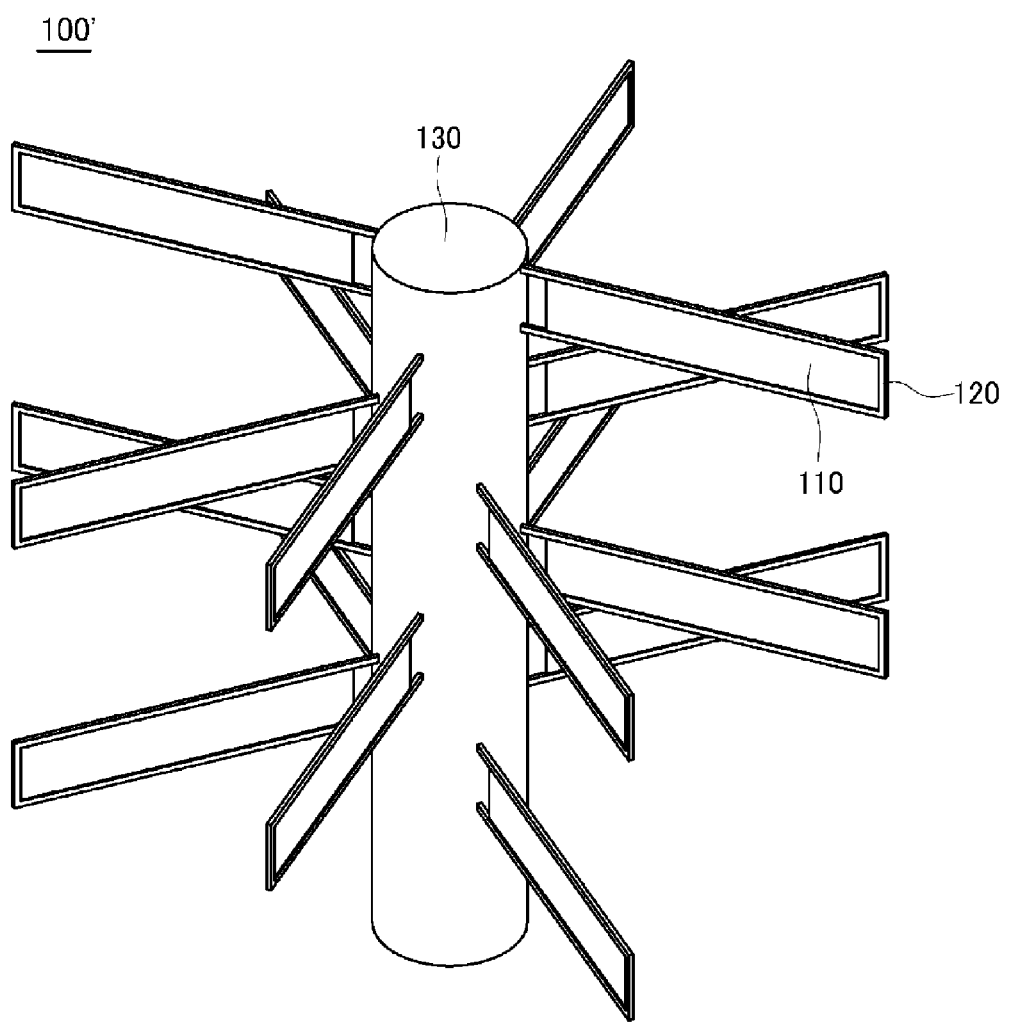
FIG. 4 shows a configuration of a piezoelectric power generator in accordance with another example embodiment.

For example, FIG. 4 shows a configuration of a piezoelectric power generator in accordance with another example embodiment. FIG. 4 illustrates that in a piezoelectric power generator 100' in accordance with another example embodiment, where a long cylindrical central axis unit 130 is provided, and the multiple pairs of the piezoelectric film 110 and the piezoelectric film supporting frame 120 are arranged along the length of the central axis unit 130 to form multiple layers.

That is, in the piezoelectric power generator in accordance with an example embodiment, the method for arranging the pairs of the piezoelectric film 110 and the piezoelectric film supporting frame 120 on the central axis unit 130 may be variously set to be optimized for a place and an environment where the piezoelectric power generator will be provided, thereby maximizing the generation efficiency. In addition, the number of the pairs of the piezoelectric film 110 and the piezoelectric film supporting frame 120 is not limited, and may be increased or reduced to be suitable for an installation environment of the piezoelectric power generator.

FIG. 1 to FIG. 4 illustrate that the central axis unit 130 is fixed, but the central axis unit 130 in accordance with another example embodiment may be configured to be in the form rotatable based on one axis depending on wind directions. For example, when wind blows from one direction toward the piezoelectric power generator, in the state that at least one of the pairs of the piezoelectric film 110 and the piezoelectric film supporting frame 120 is fixed to a certain area of an outer circumference surface of the central axis unit 130, the central axis unit 130 may be rotated such that one frame 121 of the piezoelectric film supporting frames 120 faces the wind. Accordingly, even without providing the multiple pairs of the piezoelectric film 110 and the piezoelectric film supporting frame 120 on the whole circumference of the central axis unit 130, piezoelectric power generation can be accomplished irrespective of wind directions only from a small number of the pairs of the piezoelectric film 110 and the piezoelectric film supporting frame 120.

Figure 5:
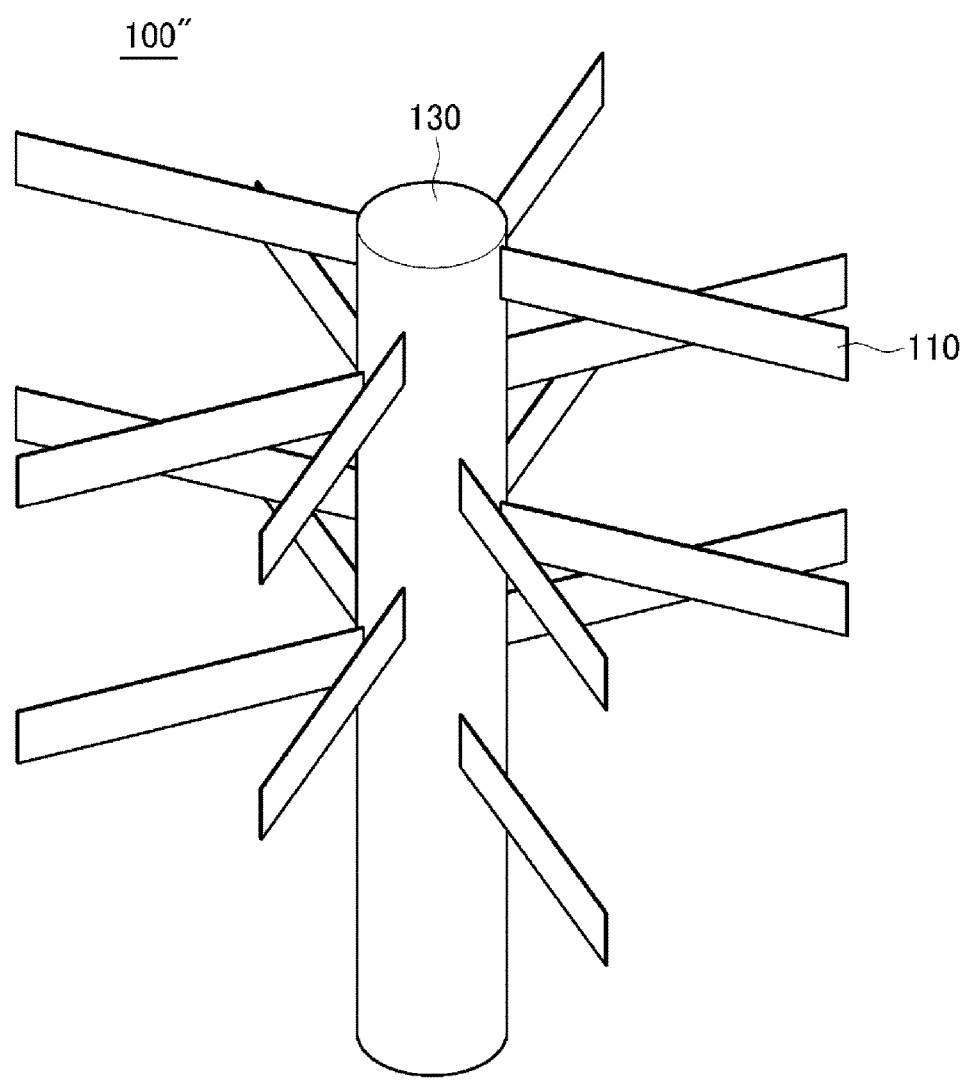
FIG. 5 shows a configuration of a piezoelectric power generator in accordance with another example embodiment

Additionally, in an environment where it is difficult to provide the piezoelectric film supporting frame 120 in the place or circumference where the piezoelectric power generator will be provided, the central axis unit 130, and not the piezoelectric film supporting frame 120, may form the vortex. Specifically, FIG. 5 shows a configuration of a piezoelectric power generator in accordance with another example embodiment. As illustrated in FIG. 5, in a piezoelectric power generator 100" in accordance with another example embodiment, one surface of the piezoelectric film 110 may be provided directly on the central axis unit 130, without providing the piezoelectric film supporting frame 120 described in FIG. 1 to FIG. 4.

Figure 6:
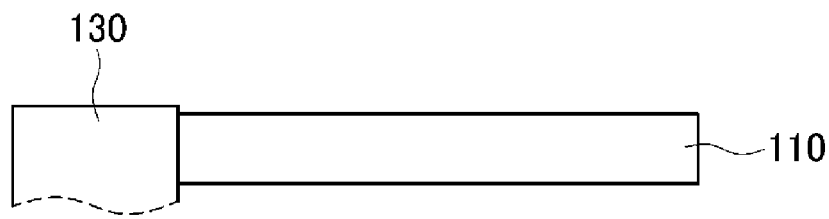
FIG. 6 shows an engagement structure of a piezoelectric film and a central axis unit in accordance with another example embodiment.

For example, FIG. 6 shows an engagement structure of a piezoelectric film and a central axis unit in accordance with another example embodiment. As shown in FIG. 6, if the piezoelectric film 110 is directly engaged to the central axis unit 130, electricity generated from the piezoelectric film 110 may be directly delivered to and stored in the charger (not illustrated).

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The method and the system of the example embodiments have been described in relation to the certain examples. However, the components or parts or all the operations of the method and the system may be embodied using a computer system having universally used hardware architecture.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A piezoelectric power generator using wind power, comprising:
   a central axis unit comprising a charger;
   a piezoelectric film supporting frame engaged onto an outer circumference surface of the central axis unit; and
   a piezoelectric film having a pre-set area and at least one side being engaged to at least one of one side part of the piezoelectric supporting frame and the central axis unit,
   wherein electricity generated by the piezoelectric film is delivered to the charger of the central axis unit, the piezoelectric film supporting frame has a shape corresponding to a shape of an edge of the piezoelectric film to surround the edge of the piezoelectric film, the piezoelectric power generator comprises at least one pair of the piezoelectric film and the piezoelectric film supporting frame, the at least one pair of the piezoelectric film and the piezoelectric film supporting frame is engaged to a certain area of the outer circumference surface of the central axis unit, and when receiving wind, the central axis unit is rotated to enable one side part of the piezoelectric film supporting frame to face the wind.

2. The piezoelectric power generator of claim 1, wherein the piezoelectric film supporting frame comprises upper and lower frames, and a side frame connected between the upper and lower frames.

3. The piezoelectric power generator of claim 2, wherein the piezoelectric film has a plurality of edges, and only a shortest one of the plurality of the edges is engaged to a corresponding frame of the upper, lower, and side frames, or the central axis unit.

4. The piezoelectric power generator of claim 2, wherein a plurality of pairs of the piezoelectric film and the piezoelectric film supporting frame are included, and one side of the piezoelectric film is engaged to identical or different frames in the piezoelectric film supporting frames included in the plurality of the pairs.

5. The piezoelectric power generator of claim 1, wherein each of the piezoelectric film supporting frame and the piezoelectric film has a rectangular shape, and the piezoelectric film supporting frame has a larger area than that of the piezoelectric film.

6. The piezoelectric power generator of claim 1, further comprising;

a wire for delivering electricity generated from the piezoelectric film to the charger, wherein the wire is connected between the piezoelectric film and the charger, and the wire passes through an internal space of the piezoelectric film supporting frame to be connected to the charger.

7. The piezoelectric power generator of claim 1, wherein a plurality of pairs of the piezoelectric film and the piezoelectric film supporting frame are included, a plurality of the chargers corresponding to the plurality of the piezoelectric films are included, and the plurality of the chargers are connected to one another in parallel by electrodes.

* * * * *